United States Patent
Thomas et al.

(10) Patent No.: US 7,603,719 B2
(45) Date of Patent: Oct. 13, 2009

(54) RESOURCE ACCESS CONTROL

(75) Inventors: Steven Robert Thomas, London (CA); Jeffrey Ronald Wannamaker, London (CA)

(73) Assignee: TVWorks, LLC., Philadelphia, PA (US)

( * ) Notice: Subject to any disclaimer, the term of this patent is extended or adjusted under 35 U.S.C. 154(b) by 844 days.

(21) Appl. No.: 11/045,218

(22) Filed: Jan. 28, 2005

(65) Prior Publication Data
US 2006/0174333 A1    Aug. 3, 2006

(51) Int. Cl.
   G06F 7/04    (2006.01)
   H04L 9/00    (2006.01)
   G06F 15/173  (2006.01)
(52) U.S. Cl. .............................. 726/29; 726/27; 726/28; 726/30; 726/2; 726/3; 713/182; 713/183; 713/184; 713/185; 709/223; 709/224; 709/225; 709/226
(58) Field of Classification Search .................... 726/29
   See application file for complete search history.

(56) References Cited

U.S. PATENT DOCUMENTS 7,343,379 B2 *   3/2008   Marvin et al. ................ 707/101
2003/0007003 A1 *   1/2003   Ostrowski et al. ........... 345/746

OTHER PUBLICATIONS

U.S. Appl. No. 10/757,620, filed Jan. 14, 2004, Wannamaker et al.

* cited by examiner

Primary Examiner—Longbit Chai
(74) Attorney, Agent, or Firm—Banner & Witcoff, Ltd.

(57) ABSTRACT

A method and apparatus for enabling multiple application programs to control a system's physical resources by way of multiple resource proxies, while still enabling exclusive control of the physical resource by one application program. Control tokens are used to limit control to one proxy. The proxy having the control token is tracked in an access control list. Java API methods that can alter the state of a physical resource are marked with an access control attribute during grinding. A resource management module intercepts API methods attempting to obtain control of the physical resource. If a proxy controlled by the application program invoking the intercepted method has control the method is allowed to use the proxy to control the physical resource.

22 Claims, 5 Drawing Sheets

RESOURCE ACCESS CONTROL

BACKGROUND OF THE INVENTION

1. Field of the Invention

The present invention generally relates to controlling access to system resources and, more specifically, to controlling application program access to physical resources in a multiple application environment.

2. Description of the Related Art

Cable television operators and their equipment suppliers participate in developing various standards and specifications to enable rapid implementation of new applications and services at low cost. One result of this effort is the OpenCable platform, which includes specifications for both hardware and middle-ware that integrate the consumer's and operator's hardware. The middle-ware software layer specifications, referred to as the OpenCable Applications Platform (OCAP), provides for standardized application programming interfaces (APIs) that enable different hardware devices to operate correctly in a cable system. In practice the application programming interfaces control the operations of the physical resources of the platform hardware.

Using APIs to control the physical resources of platform hardware has proven to be highly beneficial. In fact, a given physical resource often can be controlled by different application programming interfaces or by different application programs that are associated with the application programming interfaces by setting up multiple resource proxies (i.e., software stand-ins for a physical resource). An application program interacts with a particular resource proxy, which proxy then controls a corresponding physical resource. A given physical resource can have multiple proxies, thus allowing multiple applications to operate simultaneously.

While useful, having multiple application programs simultaneously interacting with multiple physical resource proxies can lead to various problems and conflict. For example, if one application program requires a physical resource to operate one way while another application program requires the physical resource to operate in some other way, incorrect performance will likely result. Furthermore, some application programs require exclusive access to a physical resource for correct performance. A way to ensure this it to have only one resource proxy per physical resource which, unfortunately, limits overall system performance.

SUMMARY OF THE INVENTION

Various problems in the prior art are addressed by the present invention of a method and system that enable multiple applications to access physical resources by way of multiple resource proxies, while still enabling exclusive control of the physical resource by one application. Moreover, the invention contemplates marking methods, such as Java application programming interface (API) methods, with an access control attribute so that a virtual machine (VM) such as a Java VM may intercept invocations of these methods and selectively permit a resource manager to determine whether a resource proxy of an invoking application has or is associated with an access or control token.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, wherever possible, to designate identical elements that are common to the figures.

DETAILED DESCRIPTION OF THE PREFERRED EMBODIMENT

Various embodiments of the invention enable multiple applications to access a physical resources by way of multiple resource proxies, while still enabling exclusive control of the physical resource by one application. Moreover, the invention contemplates marking methods, such as Java application programming interface (API) methods, with an access control attribute so that a virtual machine (VM) such as Java VM may intercept invocations of these methods and selectively permit a resource manager to determine whether a resource proxy of an invoking application has or is associated with an access or control token.

The invention will be described within the context of a middleware environment within a set top box (STB) within a cable television system. It will be appreciated by those skilled in the art that the invention finds broad applicability within any system in which multiple applications contend for resources that are accessed via more than one resource proxy.

The applications may be provided via, for example, Java Archive (JAR) files adapted for use in the target environment. The invention is generally applicable to conventional, compressed and/or obfuscated Java Class files, as well as other file formats adapted for delivering byte-code to an interpreter such as a virtual machine. Specifically, an additional process denoted as "Grinding" may be employed in which a number of techniques are used to produce compressed Java jar files that remain directly interpretable while achieving a significant reduction in size. In this process, all class, method and field bindings remain symbolic, thereby preserving polymorphism. The Grinding process transforms Java jars into a format denoted as a "ground" jar. Since a ground jar is in a different format than a Java jar, it cannot be interpreted by a standard Java Virtual Machine (VM), but only by a virtual machine that has been "grind enabled." If desired, however, the grind process can be reversed by an "ungrinding" process, which converts the ground Jar file into a conventional Java jar file containing conventional Java class files which may be interpreted by standard Java VM.

Techniques, methods, tools and the like associated with the grinding and ungrinding processes are described in more detail in U.S. patent application Ser. No. 10/757,620, filed on Jan. 14, 2004, and entitled METHOD OF TRANSFORMING JAVA BYTE-CODE INTO A DIRECTLY INTERPRETABLE COMPRESSED FORMAT, which is incorporated hereby by reference in its entirety for all purposes. Briefly, in one embodiment of the grinding process, a Java Archive (JAR) file is processed by removing from the JAR file at least a portion of information not necessary for running the application in the target environment; mapping at least one of application defined class, field and method names to shorter names; and mapping at least one of target environment defined class, field and method names to corresponding target device names.

Figure 1:
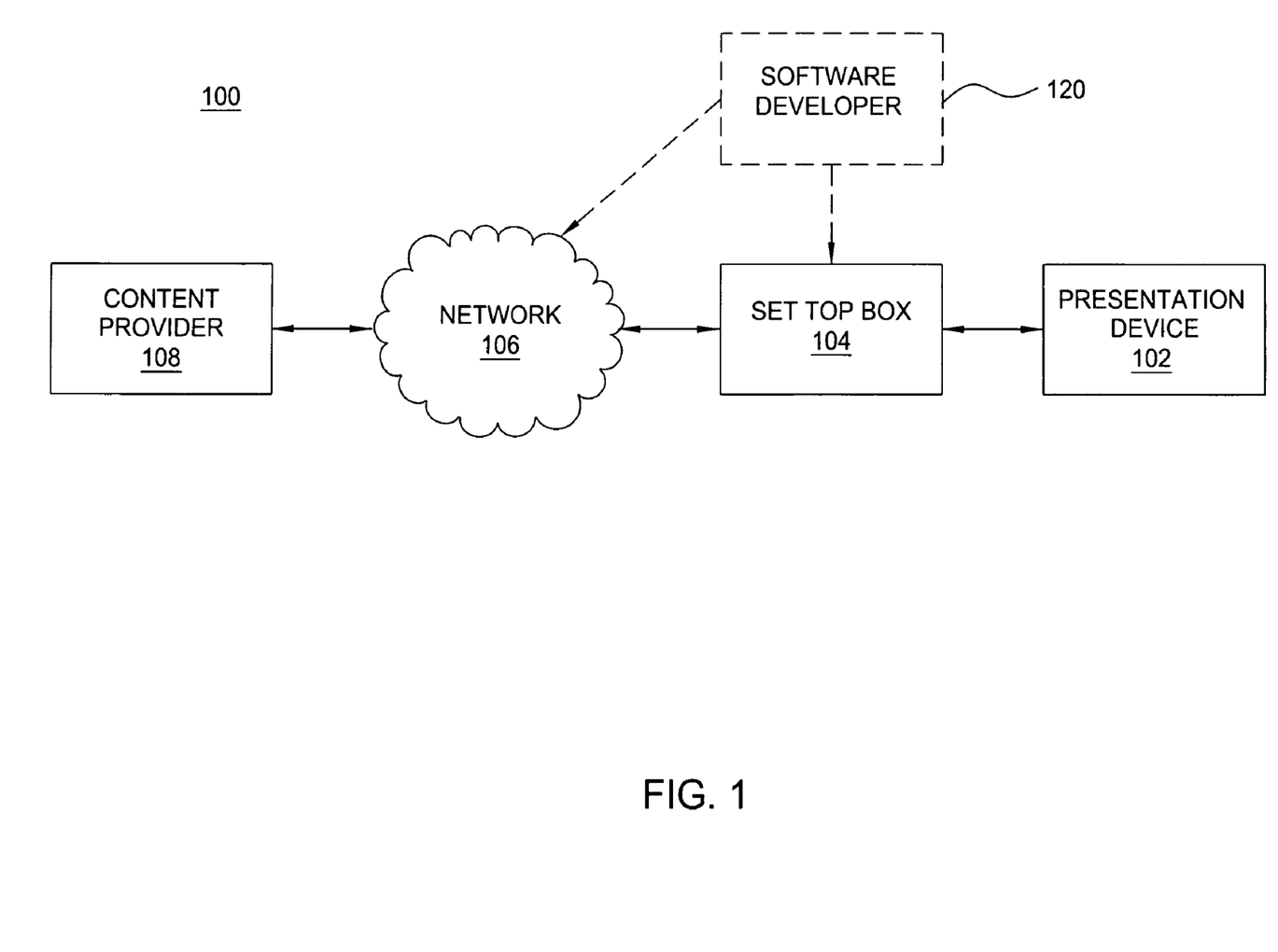
FIG. 1 depicts a high-level block diagram of an information distribution system suitable for use with the present invention.

FIG. 1 depicts a high-level block diagram of an information distribution system suitable for use with the present invention. The information distribution system 100 includes a set top box (STB) 104 that is connected to a presentation device 102 such as a television or other audio/visual display device. The set top box 104 tunes and/or otherwise selects for processing an information signal received from the communication network 106 to produce a corresponding presentation signal (e.g., a television signal or data stream) for further processing, such as display via the presentation device 102.

The communication network 106 comprises a cable television distribution system, a satellite communication network, a telephone network and/or an access network providing access to the Internet. The communication network 106 may comprise a wired or a wireless communication network.

A content provider 108 provides content such as television programming, movies, data and the like to the STB 104 via the network 106. A software developer 120 may provide application software to the set top box directly (e.g., pre-installed) or via the network 106. Either of the content provider 108 or the software developer 120 may provide preprocessed applications or application portions according to the invention, such that runtime execution or interpretation results in appropriate restrictions on access to physical resources.

The STB 104 comprises, illustratively, a processor as well as memory for storing various control programs and other programs and data. The memory may also store an operating system supporting the programs. The processor cooperates with conventional support circuitry such as power supplies, clock circuits, cache memory and the like as well as circuits that assist in executing the software routines stored in the memory. The STB also contains input/output (I/O) circuitry that forms an interface between the various functional elements communicating with the STB.

Although the STB is described herein as a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware or a combination thereof.

The STB 104 may be operably coupled to a number of devices or systems, such as input device (e.g., a keyboard, mouse, remote control and the like), a network (e.g., communications network 106), a display device (e.g., presentation device 102), a fixed or removable mass storage device/medium and the like.

The STB 104 comprises, illustratively, an Open Cable platform that is adapted to process, illustratively, JAVA-based applications that utilize techniques described herein with respect to the present invention. The applications utilize a middleware environment providing application programming interfaces (APIs) that enable the applications to perform various tasks, including the controlling of logical and/or physical resources. It will also be assumed that the application programming interfaces can cause the set top box 104 to run, or attempt to run, multiple software methods.

For purposes of discussion, it will be assumed that the STB 104 has (or has access to) a physical resource with multiple proxies that can be controlled by application programs, and that a virtual manager exists (discussed subsequently) that regulates the control of the physical resource by the multiple proxies. Examples of a physical resource includes a channel selector, a tuner, memory devices, a bidirectional link, as well as signals and processes that produce an electronic program guide, that decrypt encrypted programs, that control program access, and that record or playback programs.

The invention generally contemplates two environments, a preprocessing or server-side environment and a runtime or client side environment. The preprocessing environment is where applications such as Java applications are processed in a manner that enables subsequent runtime control of access to physical resources.

During preprocessing, the signature of each method is compared with those contained in an Access Control List (ACL). Any methods found that match an entry in the ACL are methods that have been denoted as requiring high priority or exclusive access to a resource at runtime. Such methods whose signatures match an entry in the ACL are modified (by setting a bit in the method access flags, adding an additional method attribute, or some like mechanism) in a manner hat will allow a virtual machine to recognize at runtime that this method may not be invoked without first consulting the resource manager. Optional preprocessing operations may also be performed, such as the compression, obfuscation and/or grind processing described above. Ultimately, the preprocessing of an application is performed in a manner adapted for use by a runtime environment in which a control token, however implemented, is used to control access to one or more physical resources.

During runtime, when the virtual machine is preparing to invoke a method, the VM examines the control information (i.e., control token) associated with the method (e.g., in the byte code of the class file within which the method resides). If the control token is set, then a resource management function is invoked to manage access to physical resources. Proxies of methods having a control token are granted access to a physical resource, those without the control token are either not granted access to the physical resource, or are granted only limited access to the physical resource.

Every resource proxy has a resource client. One application may own multiple resource proxies, and resource proxies may also be distributed across multiple applications. Multiple applications can instantiate common methods, where each instantiated method may be attempting to modify the same physical resource. By modifying the ACL of the various methods at preprocessing, contention for resources is avoided during runtime as discussed herein.

Figure 2:
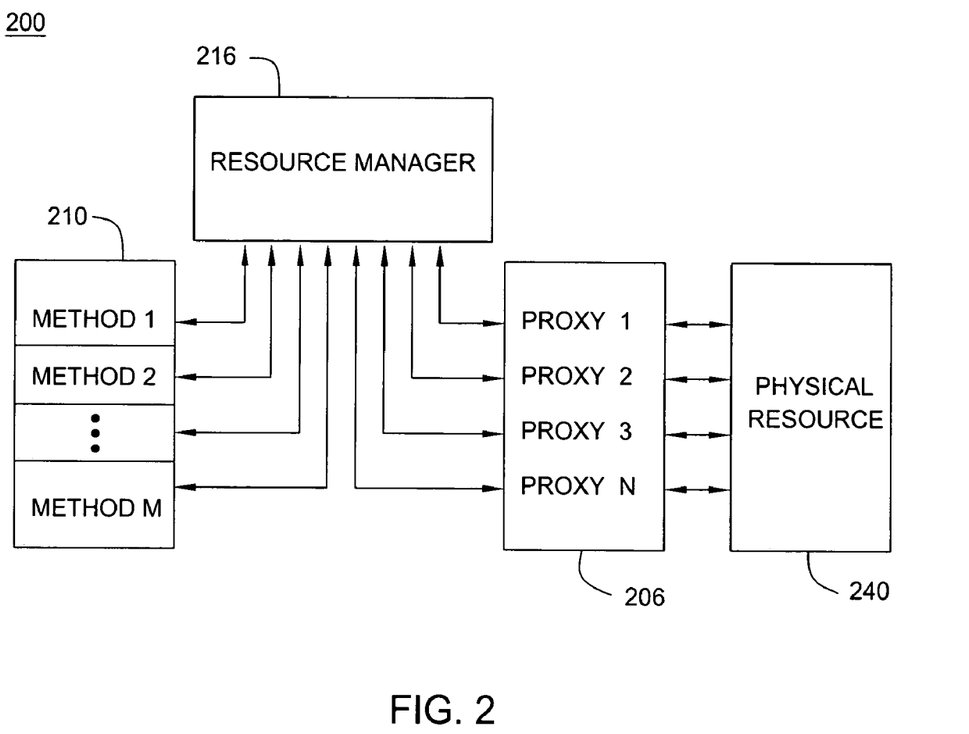
FIG. 2 depicts a conceptual view of high level flow control according to an embodiment of the present invention.

FIG. 2 depicts a conceptual view of high level flow control according to an embodiment of the present invention. Specifically, FIG. 2 depicts various functional elements utilized within the context of client-side execution or interpretation of applications by, for example, a virtual machine (VM) such as a Java VM (not shown).

One or more physical resources 240 are controlled via one to N proxies 206. A resource manager 216 controls access to the proxies 206 by one to M methods 210. The resource manager 216 maintains an access control list (ACL) of the physical resources 240 that can be controlled, the proxies 206 that can control each resource, the software methods 210 that can interact with each of the proxies, and which proxy actually has control of a physical resource. The resource manager 216 utilizes the access control list to regulate method access to the various resource proxies.

At runtime, an application invokes a method that attempts to interact with a proxy to alter the state of a physical resource. The resource manager 216 allows the action only if the proxy has been given control of the physical resource, and blocks the action if the proxy does not have control. The resource manager 216 operates to access a lookup mechanism, such as a lookup table indicative of proxy access rights in response to a virtual machine request to enforce or determine such rights.

Figure 4:
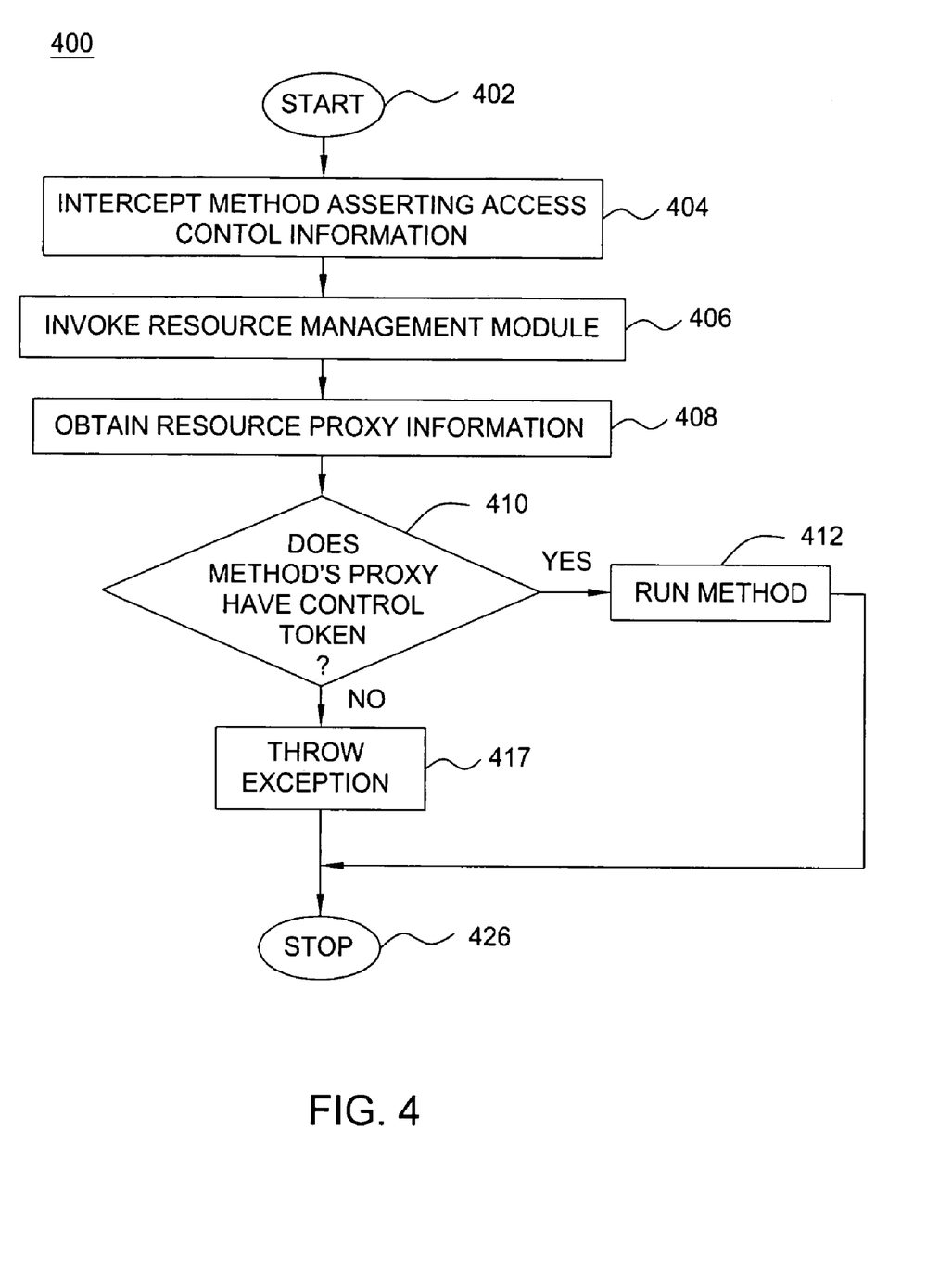
FIG. 4 depicts a flow diagram of runtime operational steps according to an embodiment of the invention.

FIG. 4 depicts a flow diagram of runtime operational steps according to an embodiment of the invention. The operation 400 of FIG. 4 is performed outside of a runtime environment, such as at a server, the content provider 108, the software developer 120 and the like.

The operation 400 of FIG. 4 is entered at step 402 and proceeds to step 404, where a virtual machine (VM) intercepts an invocation of a method, where the method asserts access control information in an attempt to interact with a proxy to alter the state of a physical resource 204. At step 406, the virtual machine responsively invokes a software resource management module (e.g., the resource manager 216) which, at step 408 obtains the requested resource's proxy information from, illustratively, an access control list.

With the proxy information available, at step 410 a decision is made as to whether the intercepted application program's proxy is associated with a control token or identifier (such as a bit or a word) that determines whether the proxy may assert control of a related physical resource. If the software method's proxy has a control token, then it can control the physical resource 204 and, at step 412, the resource management module allows the application program's method invocation to run.

If the application program's proxy does not have the control token an exception is thrown at step 417 that informs the intercepted software method that it does not have control of the physical resource 204.

Figure 5:
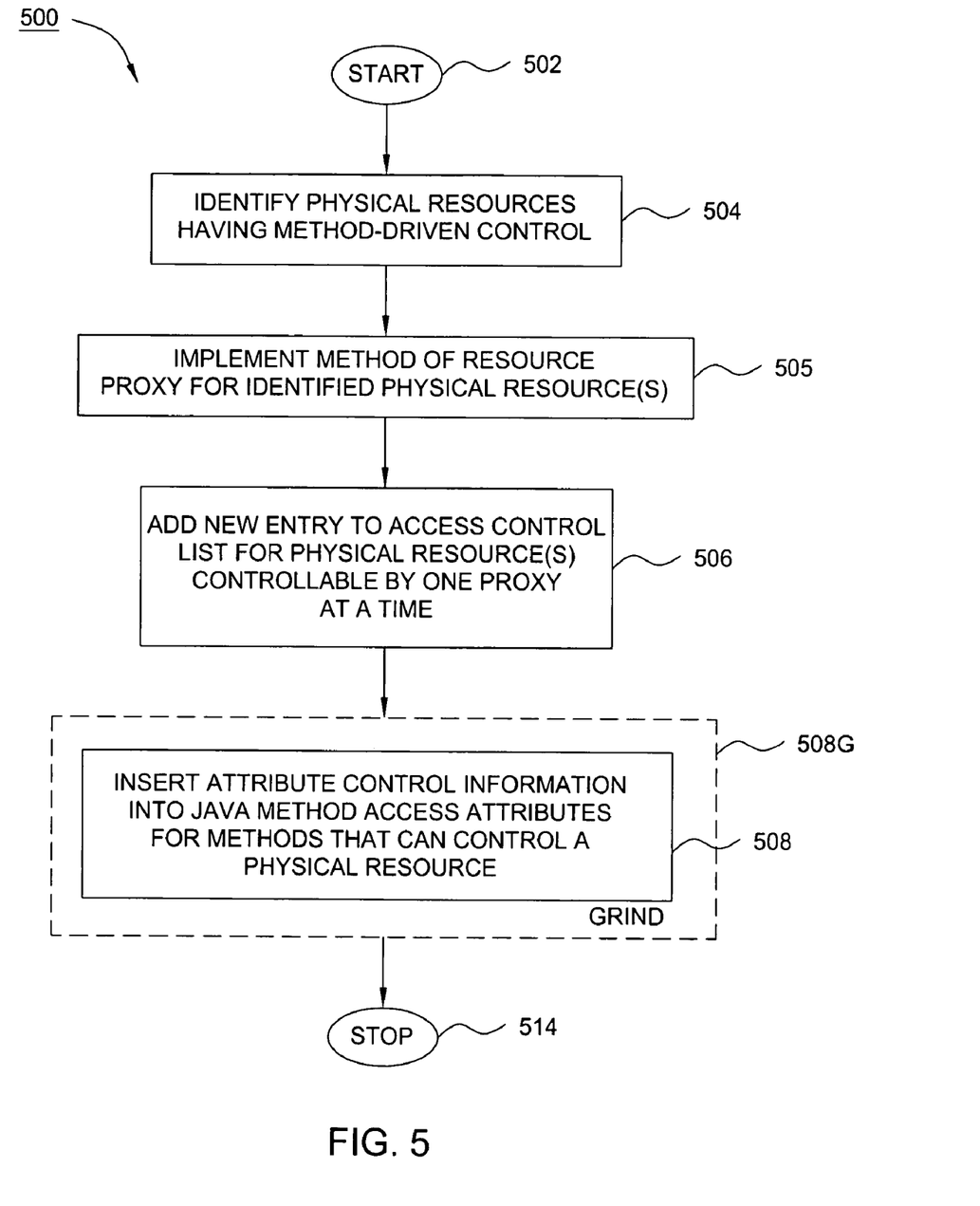
FIG. 5 depicts a flow diagram of preprocessing operational steps according to an embodiment of the invention.

FIG. 5 depicts a flow diagram of preprocessing operational steps according to an embodiment of the invention. The operation 500 of FIG. 5 is performed within a runtime environment, such as within a VM at the STB 104.

The operation 500 starts at step 502 and proceeds to step 504, where physical resources having method-driven controls are identified (i.e., those resources that will be controlled via proxies). At step 505, the method of the resource proxy for the identified physical resource(s) of step 502 is implemented. At step 506, a new entry is added to the access control list (ACL) for the physical resource(s) that are controllable by one proxy at a time.

At step 508, attribute control information is inserted into Java method access attributes for methods that can control a physical resource. Step 508 may be performed by itself, within the grind process (as step 508G) or as part of another preprocessing algorithm. A brief presentation of the steps involved in an embodiment of the grinding process will now be provided.

Figure 3:
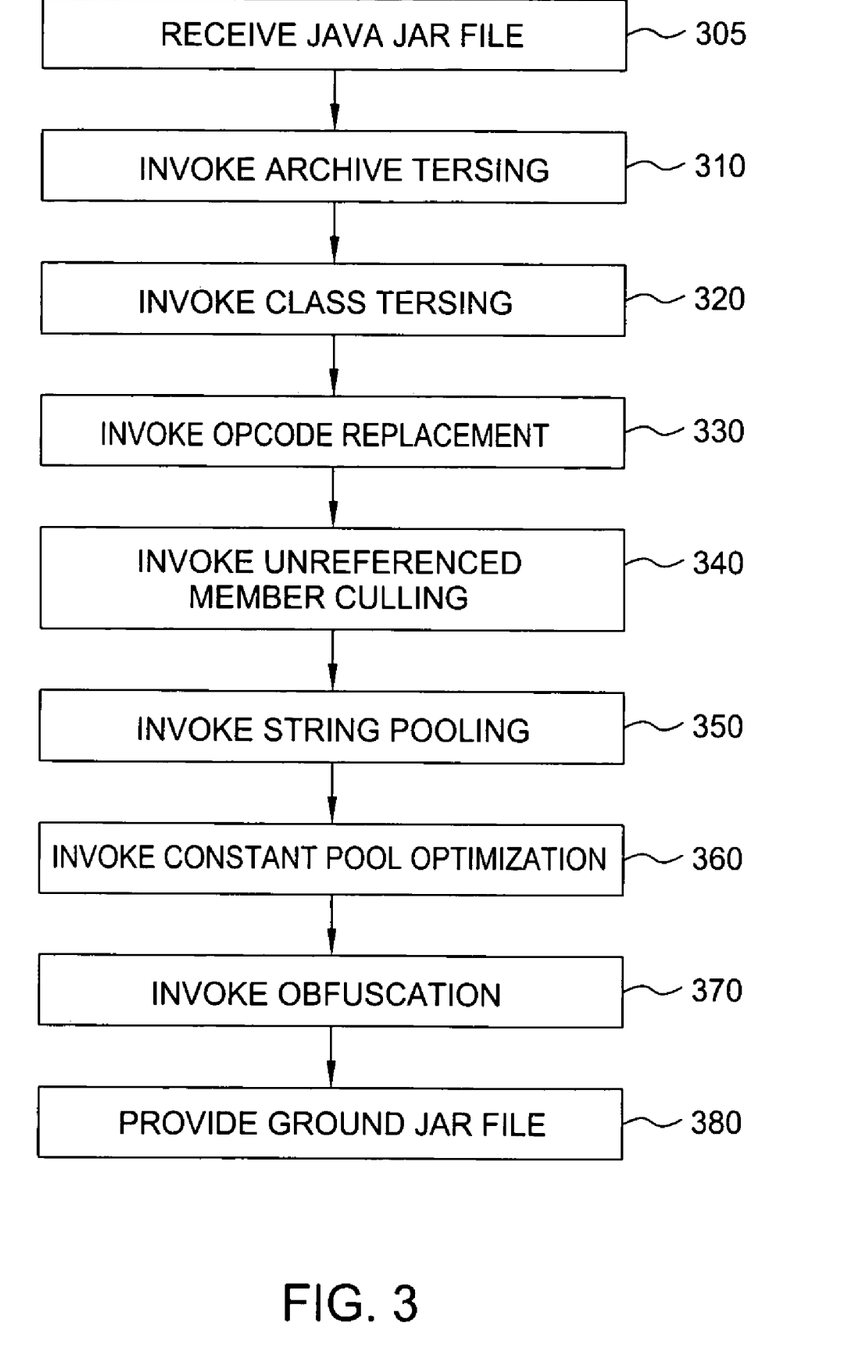
FIG. 3 depicts a flow diagram of a preprocessing method suitable for adaptation according to the preprocessing techniques of the present invention.

FIG. 3 depicts a flow diagram of a preprocessing method suitable for adaptation according to the preprocessing techniques of the present invention. Specifically, the method 300 of FIG. 3 comprises the processing of a Java jar file to provide a ground jar file. In the embodiment of FIG. 3, the steps employed are listed in a particular sequence. However, the steps of the grind process may be invoked in various other sequences and such other sequences are contemplated by the inventors. As noted above with respect to FIG. 5, the step 508 may be included within the grind processing steps denoted herein with respect to FIG. 3.

The Grind process may be performed by, for example, a server or other computing device. The Grind process 300 of FIG. 3 employs the following techniques during the transformation of a Java jar to a ground jar: (step 305) receiving a Java Jar file for processing; (step 310) invoking an archive tersing method; (step 320) invoking a class tersing method; (step 330) invoking an opcode replacement method; (step 340) invoking an unreferenced member culling method; (step 350) invoking a string pooling method; (step 360) invoking a constant pool optimization method; and/or (step 370) invoking an obfuscation method and (step 380) providing a resulting ground Jar file. Each of these techniques will now be discussed in more detail.

Specifics regarding the above described Grind techniques are described in more detail in U.S. patent application Ser. No. 10/757,620, filed on Jan. 14, 2004, and entitled METHOD OF TRANSFORMING JAVA BYTE-CODE INTO A DIRECTLY INTERPRETABLE COMPRESSED FORMAT, which is incorporated hereby by reference in its entirety for all purposes.

The inventors contemplate that the invention may be segmented into a server function and a client function. The server function comprises, e.g., the preprocessing function including optional grind method and tools for performing the control token indication and, optionally, grinding, which may be implemented on the server 108 to produce a ground jar file for propagation via the network 106 to the client 104. The client function comprises, e.g., the Java virtual machine (VM) environment and general application target environment (i.e., platform) that interprets the ground Jar file to execute the application. Within the context of a peer to peer network, the server functions and client functions may be both be implemented on client and/or server devices.

The functions associated with the invention are discussed in more detail herein with respect to the various figures. The functions may be implemented as a method by one or more processors. The functions may be embodied as software instructions within a signal bearing medium or a computer readable medium including a representation of software instructions which, when executed by a computing device, performs a method according to the invention. The invention may be implemented as a computer program product wherein computer instructions, when processed by a computer (such as may be implemented by STB 104 or content provider 108), adapt the operation of the computer such that the methods and/or techniques of the present invention are invoked or otherwise provided. Instructions for invoking the inventive methods may be stored in fixed or removable media, transmitted via a data stream in a broadcast media, and/or stored within a working memory within a computing device operating according to the instructions.

A Java Archive (JAR) file may be processed to provide an executable application file adapted for a target environment and including control tokens and other information as described above according to the various embodiments of the invention. The JAR file may further be processed according to one or more of the steps of removing from the JAR file at least a portion of information not necessary for executing said application; mapping at least one of application defined interface, class, field and method names to shorter names; and mapping at least one of target environment defined interface, class, field and method names to corresponding target device names.

While the foregoing is directed to embodiments of the present invention, other and further embodiments of the invention may be devised without departing from the basic scope thereof and the scope thereof is determined by the claims that follow.

The invention claimed is:

1. A method, comprising:

granting by a processor, via a resource manager in communication with a virtual machine, control of a resource proxy to one of up to a plurality of methods when said one method has associated with it a token indicative of a permission to control the resource proxy, wherein the virtual machine intercepts an invocation of said one method and responsively invokes the resource manager, wherein the resource manager obtains proxy information of a resource associated with the resource proxy from a security data file, and wherein said one method interacts with the corresponding resource proxy to control the associated resource.

2. The method of claim 1, further comprising:

receiving, from at least said one of said up to a plurality of methods, a request to assert control over the resource proxy; and determining if said one method has associated with it said token indicative of a permission to control the resource proxy.

3. The method of claim 2, wherein:

said token comprises at least one of a control bit, a control word and a control flag included within said method.

4. The method of claim 2, wherein:

said step of determining if said one method has associated with it said token indicative of a permission to control the resource proxy is performed upon instantiating said one method.

5. The method of claim 2, wherein:

said method is received as a compressed Java files including byte code that is directly interpretable by a virtual machine.

6. The method of claim 5, wherein:

said Jar file comprises a Java Jar file, and said virtual machine comprises a Java VM.

7. The method of claim 6, wherein said Jar file has been subjected to at least one of a compression, obfuscation and grind process.

8. The method of claim 1, wherein:

said virtual machine invokes a resource management module in response to said one method asserting access control information.

9. The method of claim 8, wherein:

said resource management module controls the access of said resource proxy in response to resource proxy information obtained from an access control list.

10. The method of claim 9, wherein said access control list is adapted for use during a server side processing of an application calling said at least one method.

11. The method of claim 1, wherein the security data file comprises an access control list.

12. An apparatus, comprising:

a physical resource having associated with it at least one resource proxy adapted to control said physical resource;

a resource manager adapted to enable use of said proxy by a method only when said method is associated with a control token; and a virtual machine adapted to intercept an invocation of said method and responsively invoke the resource manager, wherein the resource manager obtains proxy information of the physical resource associated with the resource proxy from a security data file, and wherein said method interacts with the resource proxy to control the associated physical resource, and a virtual machine adapted to intercept an invocation of said method and responsively invoke the resource manager, wherein said resource manager allows only one of said at least one resource proxies to control said physical resource.

13. The apparatus of claim 12, wherein:

said resource manager controls access of said resource proxy in response to resource proxy information obtained from an access control list.

14. The apparatus of claim 13, wherein:

said access control list being modified during a preprocessing of a Java JAR file.

15. The apparatus of claim 14, wherein:

said resource manager is generated by the virtual machine in response to the detection of said control token.

16. The apparatus of claim 12, wherein:

each resource proxy is associated with a respected resource client; and each of a plurality of resource clients associated with a single application.

17. The apparatus of claim 12, wherein:

at least one resource proxy is associated with each of a plurality of applications, wherein said applications are adapted to instantiate common methods which access said at least one resource proxy.

18. A computer readable storage medium storing software instructions that, when executed by a processor, perform a method, comprising:

granting, via a resource manager in communication with a virtual machine, control of a resource proxy to one of up to a plurality of methods when said one method has associated with it a token indicative of a permission to control the resource proxy, wherein the virtual machine intercepts an invocation of said one method and responsively invokes the resource manager, wherein the resource manager obtains proxy information of a resource associated with the resource proxy from a security data file, and wherein said one method interacts with the corresponding resource proxy to control the associated resource.

19. The computer readable storage medium of claim 18, wherein the security data file comprises an access control list.

20. A method for processing a Java Archive (JAR) file to provide an executable application file adapted for a target environment, comprising:

a processor inserting attribute control information into method access attributes for those methods adapted to control a physical resource, a virtual machine intercepting an invocation of one of the methods and responsively invoking a resource manager, wherein the resource manager obtains proxy information of the physical resource from an access control list (ACL), and wherein said one method interacts with the proxy to control the associated resource only when said one method is associated with a control token.

21. The method of claim 20, further comprising:

identifying recourses having method-driven control; and implementing resource proxies for methods associated with said identified resources.

22. The method of claim 21, further comprising:

subjecting a file including said methods adapted to control the physical resource to at least one of a compression, obfuscation and grind process.

* * * * *

UNITED STATES PATENT AND TRADEMARK OFFICE
CERTIFICATE OF CORRECTION

PATENT NO. : 7,603,719 B2
APPLICATION NO. : 11/045218
DATED : October 13, 2009
INVENTOR(S) : Thomas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1227 days.

Signed and Sealed this

Fifth Day of October, 2010

David J. Kappos
*Director of the United States Patent and Trademark Office*